ELECTRONIC INTEGRATION SYSTEMS

Filed March 19, 1954 2 Sheets-Sheet 1

INVENTOR.
FRANÇOIS HENRI RAYMOND
BY Theodore Haffner
ATTORNEY

Dec. 16, 1958 F. H. RAYMOND 2,864,556

ELECTRONIC INTEGRATION SYSTEMS

Filed March 19, 1954 2 Sheets-Sheet 2

INVENTOR.
FRANÇOIS HENRI RAYMOND
BY Theodor [signature]
ATTORNEY

United States Patent Office 2,864,556

Patented Dec. 16, 1958

2,864,556

ELECTRONIC INTEGRATION SYSTEMS

François Henri Raymond, Le Vesinet, France, assignor to Societe d'Electronique et d'Automatisme, Courbevoie, Seine, France Application March 19, 1954, Serial No. 417,354

Claims priority, application France April 15, 1953

29 Claims. (Cl. 235—61)

The present invention relates to an improved electronic integration system for use in analog computers or the like, of the kind wherein an RC circuit is used in conjunction with an electronic amplifier for so controlling the output voltage of said amplifier that its value always indicates the result of the integration of the variation of value of its input signal from the instant of starting operation of the integration system.

In a lecture entitled "Servomechanisms and experimental mathematics," published in the book "Analyse et Synthèse et position actuelle de la question des Servomécanismes," 1949, published by the Societe d'Edition de l'Enseignement Supérieur, applicant has pointed out that an integration servo-system of the electronic kind includes principally a high gain amplifier receiving an input signal $x$ through an input series resistor of value R; the output terminal of said amplifier is fed back to its input terminal through a condenser of value C, so that, at any instant, the output signal, $y$, from the amplifier, represents the value of integration of the input signal $x$, viz.:

$$y=-\frac{1}{R.C.p}\cdot x$$

$p$ being the complex pulsation of the input signal. It has further been pointed out that such an integrator device could be used within a range of maximum variation of $y$ such as determined for instance by the interval between the operative limits of the circuit which are defined by its time-constant RC; each time the value of $y$ reaches one of said range-delineating values, either the one or the other of said values, a short-circuit could be applied to the feedback condenser C and this will bring back the integrator device to its zero condition; removal of this short-circuit effects a re-starting of the operation. An algebraic count of the reset and restart operations conveys definite knowledge of the value of the integration of the input signal so that the restriction of the variation range of the output signal $y$ from the integrator amplifier will not impede any more the computation of the integrated value of any input signal $x$. It is apparent that, when and if required, an electric voltage simulating the true value of the result of said integration may be obtained by adding the output signal $y$ from the integrator amplifier and an analog voltage established on the same voltage scale as said voltage $y$ and varying in either direction by a definite step each time the reset and restart operation occurs in the integrator device. Such an analog voltage will herein be denoted by $n_i(i=0, \pm 1, \pm 2, \ldots)$ and it may easily be derived, through means well known per se, from the algebraic and reversible counter of the reset and restart operations of the integrator device. For automatizing the reset and restart operations, threshold amplitude discriminators responsive to the delineation values of the range of variation of $y$ may be provided together with a switching arrangement controlling the short-circuiting and de-short-circuiting operation of the feedback condenser of the integrator device. Such amplitude responsive means and said switching means as well as algebraic counters can be realized in a number of technical ways, all well-known per se.

In the following disclosure, the combination of an electronic integrator device and of such automatic reset and restart controlling means as hereinabove defined, will be called an integration system of the kind specified.

In such a system, however, certain drawbacks may become apparent. In the first instance, electro-mechanical switching operations may be required. Each switching operation introduces a discontinuity in the output signal from the integrator device and consequently a discontinuity in the final signal resulting from the addition of said output signal and the above-specified analog voltage. This discontinuity occupies a time interval equal to the time required by the short-circuiting operation and to the time required for de-short-circuiting operation following that short-circuiting operation. This overall time interval cannot be considered as negligible with respect to the speed of variation of the input signal in most cases of computation. In the second instance, errors can be introduced in the value of $y$ each time when, during a switching interval, the speed of variation of the input signal is not constant, and such errors are cumulative in the final result of the computation.

The general object of the invention is to provide an improved arrangement of an integration system of the kind specified, eliminating such drawbacks and errors.

Broadly stated, the improvements concerned in the present invention are characterised in that two electronic integrator devices or amplifiers are provided, both of which receive the same input signal and proceed to its integration with the same time constant characteristics; either outputs of these electronic integrators can be connected to an output path through the operation of a connection inverter arrangement so that, at any time, one of these electronic integrator outputs is connected to that output path; the reset and restart means for these two electronic integrators are so provided and so controlled from an amplitude discriminator, receiving the output at least from one of them, that they operate sequentially, and concomitantly with the inverter arrangement. The inverter arrangement is so controlled from the amplitude discriminator as to always connect to the output path the output of that electronic integrator which is normally operative within its delineation values of the range of its output signal.

Additionally, it has been found advantageous to provide for a change of the control process of these electronic integrators in their reset and restart operations; such change involves replacing a short-circuit of their condensers, i. e. a reset to zero of their output signals, by a shift of value in these output signals so that, on the one hand at any time instant the integration process is not interrupted and that, on the other hand, the restart of the normal operation of either one of the integrators is caused with a value of its output signal substantially equal to the amount by which this signal would have exceeded its corresponding delineation value if the time-constant had not been modified. To this end, the feedback condenser of either one of the electronic integrators is not short-circuited any more but its capacitance value is changed during the time interval of switching, viz. by placing a further condenser in parallel with the first condenser. This second condenser receives concurrently an auxiliary voltage of predetermined value of a direction of action opposite to that of the feedback voltage, so that a sudden shift is obtained in the value of the output voltage from the concerned integrator circuit concerned. Its integration process, however, is not interrupted and is further developed from the shifted output value.

These and other features of an integration system according to the invention are described in detail in the following disclosure, with reference to the accompanying drawings, wherein.

Figures 1, 2, 3, 4, 5, 6:
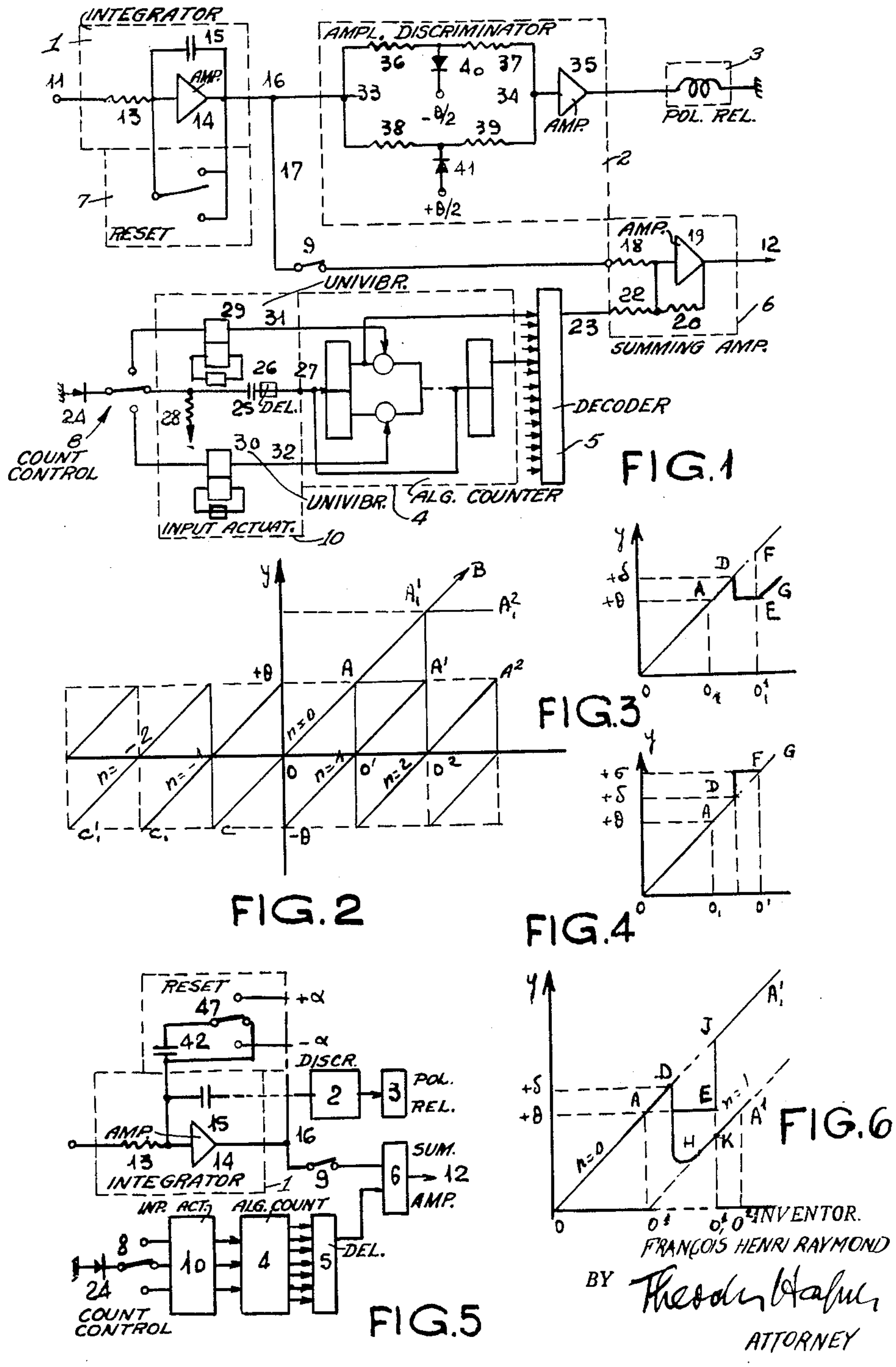
Fig. 1 shows a circuit arrangement of an electronic integration system of the above-specified kind.
Fig. 2 shows a theoretical or idealised diagram of operation of this system.
Fig. 3 represents an actual diagram of operation of the system of Fig. 1.
Fig. 4 represents another diagram of operation of the system of Fig. 1, with the optimum degree of corrective adjustment which may appear possible for the operation of this system.
Fig. 5 shows an alternative form of the arrangement disclosed in Fig. 1, wherein the reset and restart circuit is modified according to certain features of the present invention.
Fig. 6 represents the diagram of operation of the alternative arrangement of Fig. 5.

Referring to Fig. 1, an integration system of the first kind includes an electronic integrator device or circuit, 1, receiving the input signal to its terminal 11 and delivering its output signal to output terminal 16. From terminal 16, this output signal is applied to an output channel or path 17 including a series interrupter contact 9 and a summing amplifier 6 which delivers the finally transmitted output voltage to the outcoming lead 12. The output signal from 16 is also applied to an input 33 of an amplitude discriminator 2 including two threshold branches; the output voltage from amplitude discriminator 2 controls the operation of a polarized relay 3.

The integration system also includes a reversible algebraic counter 4 which, through a decoder 5, applies a decoded analog voltage to the input of summing amplifier 6 in the output path of the system.

By means of an inverter contact 7, polarized relay 3 controls the short-circuiting of condenser 15 which, in integrator circuit 1, normally connects the output of the high gain amplifier 14 which is of course an amplifier passing the D. C. component — to the input of the amplifier. The latter receives the signal at 11 through a series resistor 13. This short-circuit is obtained for either one of the directions of energisation of the relay 3.

A further inverter contact 8 is also associated with relay 3, or included therein (the relay contacts are shown separated, according to a well-known conventional representation which simplifies the drawings). This contact 8 may assume three conditions or positions of its armature: rest upper work position and lower work (which is shown in the drawing). Contact 8 controls the operation of an input actuation arrangement 10 for the algebraic counter 4.

The above-mentioned series contact 9 is also included in or controlled by the relay 3.

The summing amplifier 6 may comprise, as usual, a high gain, D. C. transmitting amplifier 19 having a negative feedback resistor 20 extending from its output to its input and provided with an input resistance mixer. In the present case, the latter comprises a resistor 18 to which there is connected contact 9 and a further resistor 22 connected to output lead 23 from the decoder 5. This decoder supplies a D. C. voltage which is continually present at output lead 23.

Reversible counter and decoder may be established from any known and conventional techniques. They may be made for instance of relay arrangements. In this case, the counter may comprise a chain of reversible step-by-step counting relays; the decoder may consist of a resistance network from the outputs of these relays, viz. from battery supplies passing through contacts of these relays. Alternatively, electronic counter and decoder arrangements may be used and, in such case, for example, counter 4 may comprise an appropriate number of bistable trigger stages, each having a symmetrical actuation input and two plate outputs connected through gates to the symmetrical actuation input of the next following stage; the last trigger stage of the cascade (on the right in the drawing) then is a sign-denoting stage and its input is connected back to the actuation input of the first trigger chain; depending on whether the upper or the lower set of gates are made conducting, whereby these sets are so controlled as to be always in opposite or reciprocal conditions of conductivity, any input pulse applied to the first stage input will make the count progress by one unit either in the additive direction (+1) or in the subtractive direction (−1). The decoder circuit then is adapted to deliver an analog voltage proportional to the value of the actual count in the counter. The latter may comprise as many gates as there are binary stages in the counter; each gate receives at its transfer input a calibrated voltage proportional to the weight of the corresponding binary digital value of the binary stage from which its conductivity is controlled, and the sign-denoting stage controls a further gate from which there is controlled the output polarity of the D. C. analog voltage constituted by the summation of the output voltages of the gates controlled from the digital representative binary stages in this counter.

Fig. 1 serves to illustrate this kind of algebraic reversible counter, and within the input actuation circuit 10 there are shown: a pair of one-shot or univibrator stages, 29 and 30, having respective outputs 31 and 32 for controlling respectively upper and lower sets of interstage connecting gates within the counter 4; a straight-through actuation channel including a negative bias resistor 28, a series capacitor 25 and a delay element 26, and extending to the actuation input 27 of the first trigger stage of the counter. The armature of the contact 8 receives a D. C. voltage from a battery or a half-wave rectifier 24. The rest position of this armature being the mid-position, the negative bias through 28 is normally balanced out by the voltage of supply 24. As soon as the armature of the contact 8 leaves its mid-position, a negative voltage charge is placed upon condenser 25 and this charge is transmitted to delay element 26, and thereby a negative actuation pulse applied to the input of counter 4. Each of the upper and lower contacts of 8 is respectively connected to the input of the upper and lower univibrators in 10. If the armature of contact 8 is brought to its upper contact, univibrator 29 is actuated and unblocks the upper set of interstage connecting gates in counter 4 before the negative actuating or triggering pulse appears at 27. If, however, the armature of contact 8 is brought to its lower contact, univibrator 30 is actuated and it is the lower set of such gates which are unblocked in the counter. At rest, both sets of gates are blocked, receiving lower voltage values from 29 and 30 on their respective control inputs, for instance on their suppressor grids if such gates consist of pentode tubes having their control grids connected to plate outputs of binary stages of the counter.

Each time a unit step of the count in 4 occurs, the output voltage of decoder 5 changes by one unit step of the count-representative analog voltage. This decoder is so adjusted as to deliver a zero voltage when the counter contains a zero count. The actual value of one step of its output voltage is adjusted in relation to the scale of the output voltage from the integrator circuit 1.

As to amplitude discriminator 2, it is also obvious that many embodiments thereof may be carried into practice. For the purpose of illustration, Fig. 1 shows a kind of amplitude discriminator making use of two transfer networks including a diode limiter, both receiving the same input signal at 33 and both delivering the transmitted signal to the input 34 of an amplifier 35 for the actuation of the above mentioned relay 3. According to the direction or polarity of the output from 35, the relay will be unbalanced in the one or other of its directions of actuation and control its armatures in their corresponding positions.

Each transfer network may comprise a pair of series resistors, for instance of equal value. These resistors are denoted by 36—37 for the first or upper branch, and 38—39 for the lower branch. The junction point of resistors 36 and 37, is connected to the anode of a diode element 40. The junction point of resistors 38 and 39 is connected to the cathode of a diode element 41. If $\theta$ denotes the value of delineation of the operative range of integrator circuit 1—a value which actually is choosen somewhat lower than the effective value of such operative range, as will be later apparent—the bias applied to the cathode of diode element 40 is equal to $-\theta/2$, and the corresponding bias applied to the anode of diode element 41 is equal to $+\theta/2$. As long as the input voltage at 33 has a value higher than $-\theta$ and lower than $+\theta$, both these diode elements will be conducting and at 34 the resulting voltage will be zero, since it will consist of the sum of $+\theta/2$ and $-\theta/2$. As soon as this input voltage reaches $-\theta$, the diode element 40 is blocked and voltage at 34 becomes at least $-\theta/2$. The output voltage of 35 becomes positive and the relay 3 is actuated in a predetermined direction. Conversely, as soon as the input voltage at 33 reaches $+\theta$, the diode element 41 is blocked, and the voltage at 34 becomes at least $+\theta/2$. The output voltage of 35 becomes negative and the relay 3 is actuated in the opposite direction. Actually, the voltage at 34 will merely be proportional to said values of $\pm\theta/2$, since the bias of the diode elements are assumed to be such that each of the resistors substantially ensures an attenuation of $\theta/2$. A small change of the input of 35 will be sufficient provided the gain of this amplifier is high and, if necessary, amplifier 35 may be established as a summing amplifier.

As soon as the voltage at 33 returns within the range delineated by the values $\pm\theta$, the cancellation process occurs at 34, both diodes being conductive, and the relay is brought back to its rest condition, viz. armatures 7 and 8 to their mid-positions, and the contact 9 to its closed condition.

If the switching process is to occur without inertia, the operation of the arangement of Fig. 1 will be such as shown in the diagram of Fig. 2. Considering for instance at the start that the output of the integrator circuit is zero as the input voltage at 11 is zero, relay 3 at rest, contact 9 closed, the contacts 7 and 8 are in their mid-positions, counter 4 at zero count and decoder 5 of zero output voltage.

When at 11 an input signal is applied, of negative polarity and arbitrary speed of variation, the output signal $y$ at 16 will develop according to the integrated value of the input signal $x$ and of course with a positive polarity since a polarity reversal is ensured by the amplifier 14. In Fig. 2, the point of operation will follow the portion of straight line OA, count $n$ being zero. When the signal $y$ reaches the value $\theta$, i. e. the higher or upper delineation value of the operative range of the integration process, amplitude discriminator 2 will operate as the diode element 41 is blocked. A negative voltage is applied to amplifier 35 which actuates, in positive polarity the relay 3. This relay operates, attracting for instance its armatures towards their upper contacts. Contact 7 short-circuits capacitor 15, and also actually the amplifier 14 of the integrator circuit 1. The contact 9 is opened and output 16 of the integrator circuit is disconnected from the output summing amplifier 6. Contact 8 produces a count of $+1$ in the counter 4. A decoded voltage equal to one unit, $+1$, is applied by decoder 5 to output summing amplifier 6. This application substantially coincides with the de-energisation of relay 3 since the voltage at 33 is again zero. Then the short-circuit is suppressed and contact 9 closes, thus connecting the output 16 to the input of the summing amplifier. The operation restarts for the integrator circuit and, seen from 12, the output voltage will follow the portion of straight line $AA^1$ in Fig. 2. From a certain point of view, the system will operate as an electric simulator of arbitrary functions progressively controlled by the signal derived from one of its component circuits.

When the output voltage at 16 again reaches $+\theta$, the same operations occur and the counter 4 progresses to $+2$, its decoded voltage will be equal to $2\theta$ and the new cycle of operation of the integrator circuit 1 will make the point of operation follow the line $A_1{}^1B$ in Fig. 2.

In Fig. 2, the lines OA, $O^1A^1$, and $O^2A^2$ have been representative of the three cycles of operation, under consideration, of integrator circuit 1, if considered per se.

If, for instance during the cycle $O^1A^1$, the input signal $x$ has changed its polarity, the point of operation would have turned around and, when reaching the point $O^1$ for the integrator circuit 1, would have entered the negative part of the characteristic for which $n=1$. When reaching the negative delineation value $-\theta$, this signal would have caused relay 3 to operate in reverse direction, and the armatures of this relay would have reached their lower positions. Consequently, counter 4 would have been actuated back to zero and so would have the decoded voltage at 23. From this instant, the point of operation would have followed the portion OC of the diagram shown in Fig. 2.

The sole limitation of the operative process apparently lies in the number of units which can be counted in 4.

In practice however, a time interval $t_0$, which can not be considered as negligible, occurs between the instant of energisation of the relay 3 and the instant at which its contacts are actually brought to their new positions. During this time interval $t_0$, the output voltage at 16 will continue to increase. For instance, and as indicated in Fig. 3, for the first cycle of operation of the integrator circuit, the output signal $y$ can reach a voltage value $+\delta$, and the corresponding point of operation will follow the straight line portion AD. When contact 9 opens and counter 4 operates, the signal at 12 falls back to $+\theta$ and is maintained at this value until the integrator circuit 1 restarts. This time interval also is not negligible since it is equal to $t_1$ i. e. the time interval necessary for the contacts to fall back to their rest positions after relay 3 has been deenergized. In the final signal, a time shift $O_1O_1{}^1$ occurs and consequently a shift EF in the actual value of the output voltage at 12. This value shift EF apparently introduces an error in the result of the integration process for each cycle of operation of the integration system. In the second cycle, the point of operation will follow an erroneous characteristic EG, and so forth, and such error will accumulate with time.

In case the speed of variation of the input signal $x$ can be considered as substantially constant during such time intervals as $O_1O_1{}^1$, an average correction can be provided through the provision of the value of one voltage step of the decoded voltage at 23 equal to $\pm\sigma$ instead of $\pm\theta$, as indicated in Fig. 4. This value $\sigma$ may be so chosen that the output level from the point D will compensate for the lacking ordinate value EF of Fig. 3. There would only remain a discontinuity such as DF in Fig. 4. Such correction, however, is impractical, in case it is required that the system operates for relatively high speeds of variation of the input signal $x$.

It is therefore provided, according to the invention, to replace the short-circuiting and deshort-circuiting process for controlling the integrator circuit 1, by a temporary application to the input of the amplifier 14 in said circuit of a definite voltage, equal or lower than the voltage value $\theta$ and of opposite direction or polarity to the voltage fedback through condenser 15, at its instants of application to the integrator circuit. Furthermore, such auxiliary voltage is to be applied to the input of amplifier 14 through an additional condenser; the effective introduction of this additional condenser in the circuit of the integrator modifies the time-constant of integration during the corresponding periods. As will be seen, however, such switching of an additional condenser does not interrupt per se the operation of integrator circuit 1.

Fig. 5 shows this alternative arrangement embodying the above mentioned structural and operative features; this arrangement is otherwise similar to that disclosed in Fig. 1. The additional condenser is shown at 42 and is connected to the input of amplifier 14 from one of its armatures or electrodes. A short-circuit is applied to condenser 42 through the armature and rest contact of an additional contact 47 substituted for the contact 7 of Fig. 1, and this contact 47 is controlled by or included in the relay 3. At its respective upper and lower work contacts, there are applied voltages of predetermined values, $+\alpha$ and $-\alpha$ respectively. When contact 47 has its armature controlled for making contact with its upper contact, voltage $+\alpha$ is applied to the input of said amplifier 14 together with the voltage fedback from output terminal 16 through condenser 15. Conversely, when the contact 47 is brought to its lower work position, it is the voltage $-\alpha$ which is applied to the input of amplifier 14. With the conventions adopted for the operation disclosed with respect to Fig. 1, the additional voltage $\pm\alpha$ will always be of opposite polarity to that of the fedback voltage. Obviously, this additional voltage disappears as soon as the armature of 47 breaks its contact with either one of its associated contacts.

For the purpose of illustration, the value $\alpha$ may be chosen equal to the value $\Theta$. This however is not imperative and the value of $\alpha$ may be chosen of any other value, not higher than $\Theta$.

Considering in the diagram of Fig. 6, the case of $\alpha<\Theta$, and assuming that the output signal $y$ of the integrator 1 reaches the delineation value $+\Theta$ and arrives at a higher value, then from point D of ordinate $\delta$ higher than $\Theta$, and depending upon the time interval necessary for the change-over of the contacts of relay 3 from their rest positions to their respective work positions, there will occur with a circuit arrangement such as disclosed in Fig. 5, a sudden decrease of the output voltage followed by an intermediary period. During this period at H, this output voltage returns to a value which, at the point denoted by K is equal to the value of the ordinate $O_1{}^1K$, and the corresponding point of operation is situated on line portion $O^1A^1$ of the characteristic shown.

For $n=1$, from the instant corresponding to the abscissa of point D, decoder 5 has applied a voltage $+\Theta$ to input of the summing amplifier 6. At the instant $O_1{}^1$, contact 9 is closed and voltage $O_1{}^1K$ is added to voltage $\Theta$ so that the point of operation rises from E to J. This point J is situated on the straight line $OADA_1{}^1$. The integration process has not been interrupted and the output voltage after the deviation shown will continue to be correctly delivered at 12.

Figure 7:
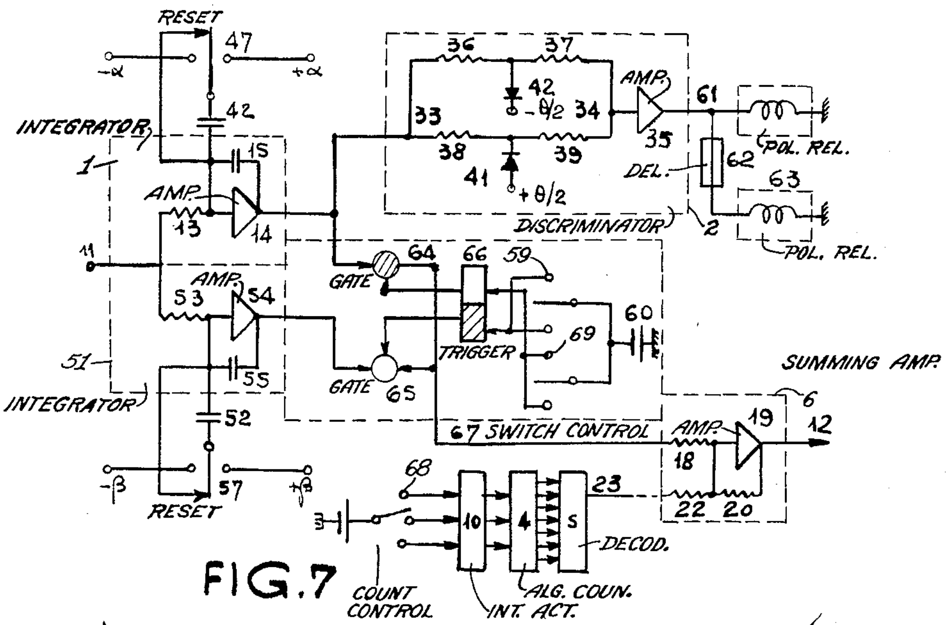
Fig. 7 shows an integration arrangement, derived from the arrangement of Fig. 5 and including an assembly of the constructive features provided in accordance with the present invention.
Figure 8:
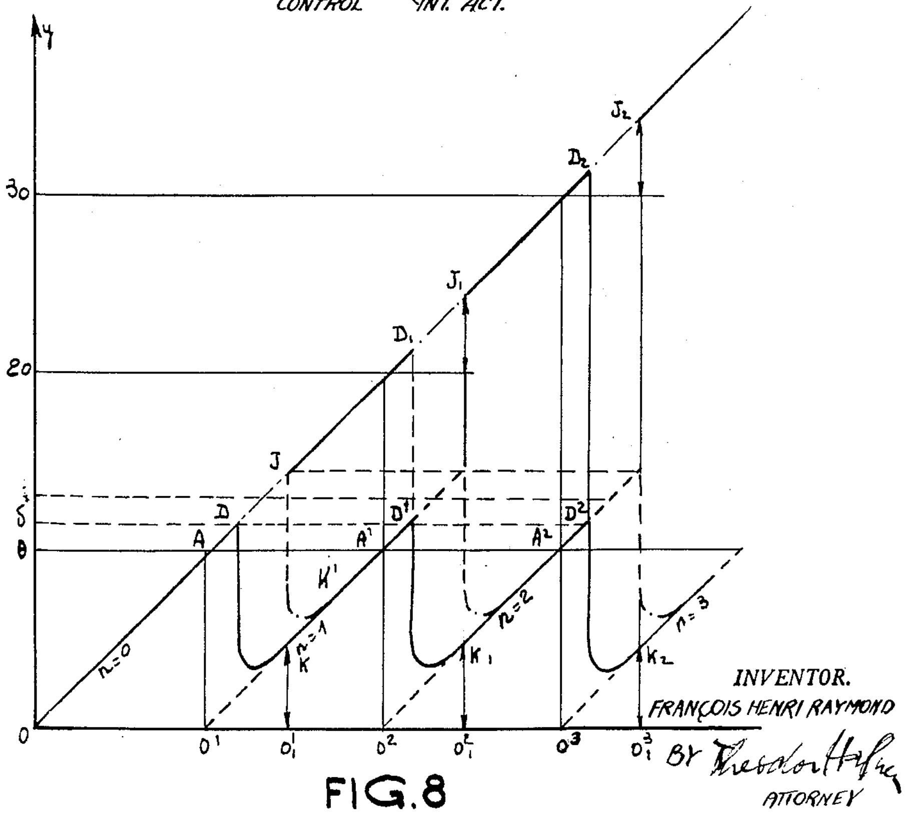
Fig. 8 shows the diagram of operation of the arrangement of Fig. 7.

There remains the above-said deviation during the time interval covering the variation D to J of the voltage. In order to cancel this deviation, according to the invention, a further modification of the arrangement of Fig. 5 is provided. Any of the line portions such as DJ, $D_1J_1$, $D_2J_2$, . . . Fig. 8, will be established in their true voltage continuity, and to this end, an arrangement such as disclosed in Fig. 7 will be used, as a further example of an integration system according to the invention utilising various components such as illustrated in Fig. 1. In Fig. 7, a further integrator circuit 51 receives the same input signal at 11 as that applied to the input of the first integrator circuit 1. Integrator 51 has its input series resistor 53 branched off input terminal 11, and includes an amplifier 54 having a feedback condenser 55 extending from its output to its input. A shift control condenser 52 is also provided in this second integrator circuit 51, associated with an inverter contact 57. The values of resistors and condensers as well as the gains of amplifiers are the same in both integrator circuits 1 and 51. It is not imperative however that the voltage values $\pm\beta$ applied to the work contacts of 57 be the same as the voltage values $\pm\alpha$ applied to the work contacts of 47. In the diagram of Fig. 8, however, it is assumed that $\alpha=\beta<\Theta$.

This second integrator circuit is controlled to operate with some delay with respect to the first integrator. Control is initiated for instance from a second polarized relay 63. Relay 63 is controlled from the output of the amplitude discriminator 2, branched off at 61, but through a delaying element or arrangement 62 of any suitable kind for delaying D. C. voltage changes. Contact 8 of relay 3, in Fig. 1 is replaced by a similarly established contact 68 of said second relay 63 so that the variations in the count of the counter 4 and consequently the variations in the decoded voltage of decoder 5 are controlled from relay 63 and, thereby, delayed, upon the operation of contacts 47 of the first relay 3.

The outputs of the two integrator circuits 1 and 51 are connected respectively to inputs of gates 64 and 65. These gates may, for instance, include pentode vacuum tubes, as well known. Their conditions are reciprocally controlled from the plate outputs of a bistable trigger stage 66, for instance by biassing voltages derived from the plates of said stage 66 and controlling their supressor grids. This bistable trigger stage is D. C. controlled, having separate symmetrical inputs. One of these inputs is connected to the work contacts of an inverter contact 59 forming part of relay 3. The other input is connected to the work contacts of an inverter contact 69 forming part of relay 63. A battery supply 60 is common to both armatures of contacts 59 and 69 so that each time one of these armatures is attracted to either one of it work contacts, trigger stage 66 is actuated from one of its conditions to the other.

When the output voltage from integrator circuit 1 reaches either one of the two delineation values $\pm\Theta$, relay 3 is actuated and controls contact 59 which assumes its corresponding work position. This contact 59 is controlled simultaneously with contact 47 changing the time-constant of the integrator circuit 1 and also applying the shift control voltage $\pm\Theta$ to the input of amplifier 14, according to the direction of energisation of relay 3. At the time of closure of these contacts, the output voltage from either one of the integrators is $\delta$, point D in Fig. 8. The trigger stage 66 operates and blocks gate 64, thus unblocking gate 65. In the output channel, at 67, the output voltage from 51 is substituted for the output voltage from 1, without any interruption, as soon as contact 59 is changed; this control is purely electronic and inertialess. Then the output voltage from 1 varies according to DK, Fig. 8, but this variable voltage does not pass through gate 64. On the other hand, there is transmitted through gate 65 to lead 67 the output voltage of the integrator 51 the variation of which is handled normally in accordance with the integration process of said circuit 51.

At the instant $O_1{}^1$, the delayed action relay 63 has been energised and its contacts 57 and 69 are simultaneously closed. Relay 3 has been deenergised so that the contact 47 has been moved back to its mid-position, and the integrator circuit 1 has returned to its normal operation, along $O^1A^1$ in Fig. 8. When contact 69 closes, it brings back trigger stage 66 to its former condition, and gate 65 is blocked but gate 64 is unblocked. The output voltage from 51 follows the variation $JK^1$ but is not transmitted any more to lead 67. On the other hand, on this lead 67, there again is received the output voltage from 1, developing in accordance with curve $JD_1$. This development will be normal until abscissa $O^2$ is reached, where the same operation is repeated; and so forth.

The output voltage from 51 will follow curve $JK^1$ and will further coincide again with curve $K^1A^1D^1$ so that both output voltages from 1 and 51 will coincide until this next operative cycle is reached; and so forth.

The overall characteristic of the integration system will thus be represented, for the positive values of $y$, by the straight line $OADJD_1J_1D_2J_2$ . . . . For negative variations $y$ the characteristic is apparently symmetrical to the above line with respect to the origin O. Line portions OD, $JD_1$, $J_1D_2$, . . . are supplied from the operation of the first integrator circuit 1, line portions DJ, $D_1J_1$, $D_2J_2$, . . . are supplied from the operation of the second integrator circuit 51.

For a suitable result, it is practical that the operating delay of the relay 63 with respect to the operation of relay 3 is such that the output voltage of the first integrator circuit 1 must have had its stray variation completed before relay 63 actually closes its contacts, and conversely that relay 3 cannot be reoperated before the output voltage from 51 has completed its own stray variation.

Obviously, the arrangement of Fig. 7 could be so modified that each integrator circuit could control the operation of the switching cycles according to the sign of the delineation value received: for instance, integrator circuit 1 could control the operation each time the signal $y$ is positive (only contact $-\alpha$ would be preserved in 47) and integrator circuit 51 could control the operation each time the signal $y$ is negative (only contact $+\beta$ would be preserved in 57); both outputs of 1 and 51 control half of the disclosed amplitude discriminator 2. Relays 3 and 63 are reached through a polarity discriminating network, each relay being provided with an additional delayed contact for controlling the operation of the other so that the sequential operation of these relays will be ensured in accordance with the polarity of the output signal $y$. Such an alternative form, as well as any alternative structure of the component circuits herein disclosed, are within the scope of the invention.

Having now described my invention, I claim:

1. An electronic integration system comprising in combination first and second electronic integrator circuits of identical operative ranges of output voltage values, means for applying the same input signal to both circuits, means for resetting the output voltages within their operative ranges, a common output channel and reciprocally operative gating means from the outputs of said circuits to said common output channel, threshold amplitude discriminating means responsive at least to one definite value of the output voltage of at least one of said integrator circuits, and switching means controlled from the response of said threshold amplitude discriminating means for so controlling said gating means that the output signals from said integrator circuits are sequentially applied on said common output channel and the respective output voltages are reset concomitantly and in reverse sequence.

2. An electronic integration system comprising in combination first and second electronic integrator circuits of identical operative ranges of output voltage values, each of said integrator circuits including means for a controlled resetting of its output voltage within said operative range of values, means for simultaneously applying the same input signal to both integrator circuits, a common output channel and reciprocally operative gating means from the outputs of said integrator circuits to said common output channel such that one output voltage from said circuits within said operative range always is applied to said common output channel, threshold amplitude discriminating means responsive at least to one definite value adjacent to one delineation value of said operative range, of the output voltage of at least one of said integrator circuits, and switching means controlled from the response of said threshold amplitude discriminating means for so controlling said gating means and said resetting means that said integrator circuits are sequentially reset while their outputs are concomitantly and reversely substituted in their connections through said gating means to said common output channel, whereby the final output voltage on said output channel always represents the correct result of the integration of the input signal.

3. An electronic integration system according to claim 1, wherein each of said integrator circuits includes a high gain D. C. amplifier having a negative feedback condenser from its output to its input and receiving its input signal through a series resistor, and wherein said switching means includes means for temporarily short-circuiting said negative feedback condenser for resetting the output voltage of such an integrator circuit within its operative range.

4. An electronic integration system according to claim 1, wherein each of said integrator circuits each includes a high gain D. C. amplifier having a negative feedback condenser from its output to its input and receiving its input signal through a series resistor, and wherein said switching means includes means for temporarily changing the time-constant of said circuit and concomitantly applying a corrective voltage of a polarity opposite to that of the fedback voltage to the input of said amplifier for resetting its output voltage within its operative range.

5. An electronic integration system according to claim 4, wherein said time-constant changing and corrective voltage introducing means includes an additional condenser having one of its electrodes connected to the input of said amplifier and the other electrode connected to the armature of a contact in said switching means which receives said corrective voltage at its fixed contact.

6. An electronic integration system according to claim 5, wherein said switching contact is a change-over contact having contacts associated to which there are applied respectively, reference voltages of opposite polarities of a value not higher than the value of the output voltage of the integrator circuit concerned which actuates said threshold amplitude discriminating means, and wherein said threshold amplitude discriminating means is also adapted to discriminate against the polarity of said output voltage at a definite value thereof, said switching means being also adapted to discriminate against the polarity of the threshold signal for controlling said change-over contact.

7. An electronic integration system according to claim 6, wherein said switching means includes at least one polarized electro-mechanical relay having at least a change-over contact for controlling the resetting of one of said integrator circuits and at least a change-over contact for so controlling said gating means as to substitute the output of the other of said integrator circuits for the output of the reset circuit on said common output channel at least during the time interval of resetting of said circuit, and further means controlled from said polarized relay for controlling delayedly the resetting of the second of said integrator circuits and controlling concomitantly said gating means in the reverse direction of action with respect to said common output channel.

8. An electronic integration system according to claim 7, wherein said further control means includes a set of delayed break and make contacts of the same polarized relay.

9. An electronic integrator circuit according to claim 7, wherein said further control means includes a further polarized relay of delayed action with respect to the first.

10. An electronic integration system according to claim 7, wherein said gating means are controlled from change-over contacts of said polarized relay and of said further control means through a bistable trigger circuit, the plate outputs of which respectively control the conditions of a pair of gates having a common output to said common output channel and receiving their input signals from the first and the second of said integrator circuits respectively.

11. An electronic integration system according to claim 6, wherein said polarity responsive switching means includes a pair of electro-mechanical relays actuated through unidirectional elements of opposite directions of connections from the output of said polarity discriminating threshold responsive means, each relay being provided, further to its own sets of control contacts for said resetting and gate control operations, of an additional set of contacts of delayed action for the delayed operation of the other of said relays.

12. An electronic integration system according to claim 1, wherein in said common output channel there is provided a summing amplifier having one of its inputs connected to the output of said gating means, and further comprising a counter and a decoder for said counter delivering an analog voltage varying by one step each time the count in said counter varies by one unit, the output of said decoder being connected to another input of said summing amplifier, and wherein means are provided for varying by one step the count of said counter each time a response is obtained from said threshold amplitude discriminating means.

13. An electronic integration system according to claim 12, wherein said switching means controlled from the response of said threshold amplitude discriminating means includes means for also varying by one unit the count of the said counter concomitantly with the second resetting of an integrator circuit in the sequence of operation of said switching means.

14. An electronic integration system according to claim 12, wherein said counter is an algebraic reversible counter and wherein said switching means controls the additive operation in said counter from polarity responsive means thereof.

15. An electronic integration system according to claim 12, wherein said counter and said decoder are purely electric components.

16. An electronic integration system according to claim 15, wherein said decoder is a relay decoder.

17. An electronic integration system according to claim 12, wherein both said counter and said decoder are electro-mechanical relay assemblies.

18. An electronic integration system according to claim 12, wherein said counter is an alegbraic reversible counter and wherein said switching means controls the additive operation in said counter from polarity responsive means thereof.

19. An electronic integration system according to claim 15, wherein said decoder is a resistance decoder.

20. In an electronic integration system, first and second electronic integrator circuits of identical operative ranges of output voltage values, means for applying the same input signal to both circuits, means for resetting the output voltages a common output channel and reciprocally operative gating means from the outputs of said circuits to said common output channel, threshold amplitude discriminating means responsive to one definite value of the output voltage of at least one of said integrator circuits, and switching means controlled from the response of said threshold amplitude discriminating means for so controlling said gating and resetting means that the output signals from said integrator circuits are sequentially applied on said common output channel and reset concomitantly in reversed sequence.

21. System according to claim 20, comprising in each of said integrator circuits means for a controlled resetting of its output voltage within said operative range values.

22. System according to claim 20, wherein said switching means include at least one polarized electro-mechanical relay having at least a changeover contact for controlling the resetting of one of said integrator circuits and at least a changeover contact for so controlling said gating means as to substitute the output of the other of said integrator circuits for the output of the reset circuit on said common output channel at least during the time interval of resetting of said circuit, and further means controlled from said polarized relay for controlling delayedly the resetting of the second of said integrator circuits and controlling concomitantly said gating means in the reverse direction of action with respect to said common output channel.

23. System according to claim 22, wherein said further control means include a set of delayed break and make contacts of the same polarized relay.

24. System according to claim 22, wherein said further control means include a further polarized relay of delayed action with respect to the first.

25. System according to claim 22, wherein said gating means include a pair of gates controlled from changeover contacts of said polarized relay and of said further control means through a bistable trigger circuit, the plate outputs of which respectively control the conditions of a pair of gates having a common output to said common output channel and receiving their input signals from the first and the second of said integrator circuits respectively.

26. System according to claim 20, wherein said switching means are polarity responsive and include a pair of electro-mechanical relays actuated through unidirectional elements of opposite directions of connections from the output of said threshold amplitude discriminating means, each relay being provided, further to its own sets of control contacts for said resetting and gate control operations, with an additional set of contacts of delayed action for the delayed operation of the other of said relays.

27. System according to claim 20, wherein in said common output channel there is provided a summing amplifier having one of its inputs connected to the output of said gating means, and further comprising a counter and a decoder for said counter, delivering an analog voltage varying by one step each time the count in said counter varies by one unit; the output of said decoder being connected to another input of said summing amplifier; and wherein means are provided for varying by one step the count of said counter each time a response is obtained from said threshold amplitude discriminating means.

28. System according to claim 27, wherein said switching means include means for also varying by one unit the count of said counter concomitantly with the second resetting of an integrator circuit in the sequence of operation of said switching means.

29. System according to claim 27, wherein said counter is an algebraic reversible counter and wherein said switching means controls the additive operation in said counter from polarity responsive means thereof.

References Cited in the file of this patent

UNITED STATES PATENTS 2,621,292 White _________________ Dec. 9, 1952

OTHER REFERENCES

Meneley et al.: "Application of Electronic Differential Analyzers to Engineering Problems." Proceedings of the I. R. E., October 1953, pages 1487–1496.